(12) United States Patent
Ehama et al.

(10) Patent No.: US 6,398,257 B1
(45) Date of Patent: Jun. 4, 2002

(54) TWO STAGE-IGNITION AIR BAG SYSTEM FOR VEHICLE AND IGNITING METHOD THEREOF

(75) Inventors: Mitsuo Ehama, Kanagawa-ken; Kouichi Shibuya, Tokyo; Masanori Narita, Kanagawa-ken, all of (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/572,868

(22) Filed: May 18, 2000

(30) Foreign Application Priority Data

May 20, 1999 (JP) ............................................. 11-140327

(51) Int. Cl.[7] .............................................. B60R 21/32
(52) U.S. Cl. ......................... 280/735; 280/741; 701/45
(58) Field of Search ................................. 280/735, 741; 180/268, 271; 701/45

(56) References Cited

U.S. PATENT DOCUMENTS

| 5,400,867 | A | * | 3/1995 | Muller et al. ................ 180/268 |
| 5,684,701 | A | * | 11/1997 | Breed .................. 364/424.055 |
| 6,181,998 | B1 | * | 1/2001 | Kanameda et al. ........... 701/45 |
| 6,219,605 | B1 | * | 4/2001 | Bauer et al. .................. 701/45 |
| 6,254,124 | B1 | * | 7/2001 | Angermaier ................ 280/735 |

FOREIGN PATENT DOCUMENTS

JP 7-47910 2/1995

* cited by examiner

Primary Examiner—Kenneth R. Rice
Assistant Examiner—Christopher Buchanan
(74) Attorney, Agent, or Firm—McDermott, Will & Emery

(57) ABSTRACT

A two stage-ignition air bag apparatus for a vehicle of the present invention includes an air bag, a first inflator ignited when a value according to collision severity has reached a first threshold value in order to inflate the air bag, and a second inflator ignited at earlier one of times when the value according to collision severity has substantially reached a second threshold value that is greater than the first threshold value and when a predetermined time has passed since the value according to collision severity reached the first threshold value in order to inflate the air bag. Also, a method of igniting the two stage-ignition air bag apparatus of the present invention includes the steps of igniting the first inflator when a value according to collision severity has reached a first threshold value, and igniting the second inflator at earlier one of times when the value according to collision severity has substantially reached a second threshold value that is greater than the first threshold value and when a predetermined time has passed since the value according to collision severity reached the first threshold value.

10 Claims, 2 Drawing Sheets

TWO STAGE-IGNITION AIR BAG SYSTEM FOR VEHICLE AND IGNITING METHOD THEREOF

BACKGROUND OF THE INVENTION

The present invention relates to an air bag apparatus and igniting method thereof, and particularly relates to a two stage-ignition air bag apparatus for a vehicle and igniting method thereof.

Japanese Patent Application Laid-open publication No. 7-47910 discloses a two stage-ignition air bag apparatus for a vehicle.

SUMMARY OF THE INVENTION

According to study by the present inventors, there is a structure having two inflators for inflating an air bag as a two stage-ignition air bag apparatus for a vehicle. In such a structure, control for delaying ignition timing of the one inflator after ignition timing of the other inflator is considered to be possible.

More specifically, the air bag apparatus is considered in which control is carried out such that only one inflator is ignited to inflate the air bag by output of generated gas when an extent of collision is small and large gas generating output is not required while the other inflator is also ignited after ignition of the one inflator to inflate the air bag with large gas generating output when the extent of collision is large.

However, in such an air bag apparatus, when the degree of collision is small, only the one inflator is ignited and the other inflator remains unused.

Although a simple structure can be achieved in such an air bag apparatus by forming a single unit from an air bag and the two inflators, the whole unit including the unused inflator is necessary to be replaced after using the air bag apparatus.

In such replacement, it is necessary to eventually dispose of the air bag apparatus detached from a vehicle body. However, because gas generating agent similar to gunpowder remains sealed inside the other unused inflator, additional complicated treatment such as to ask for air bag apparatus disposal specialty service is required.

It is an object of the present invention to provide a two stage-ignition air bag apparatus for a vehicle and igniting method thereof in which disposal of the air bag apparatus after use can be carried out easily.

The two stage-ignition air bag apparatus for the vehicle of the present invention includes an air bag, a first inflator ignited when a value according to collision severity has reached a first threshold value in order to inflate the air bag, and a second inflator ignited at earlier one of times when the value according to collision severity has substantially reached a second threshold value that is greater than the first threshold value and when a predetermined time has passed since the value according to collision severity reached the first threshold value in order to inflate the air bag.

In other words, the two stage-ignition air bag apparatus for the vehicle of the present invention includes the air bag, first gas generating means ignited when the value according to collision severity has reached the first threshold value in order to inflate the air bag, and second gas generating means ignited at earlier one of times when the value according to collision severity has substantially reached the second threshold value that is greater than the first threshold value and when the predetermined time has passed since the value according to collision severity reached the first threshold value in order to inflate the air bag.

On the other hand, a method of igniting the two stage-ignition air bag apparatus for the vehicle of the present invention including the first inflator and the second inflator comprises the steps of igniting the first inflator when the value according to collision severity has reached the first threshold value and igniting the second inflator at earlier one of times when the value according to collision severity has substantially reached the second threshold value that is greater than the first threshold value and when the predetermined time has passed since the value according to collision severity reached the first threshold value.

DETAILED DESCRIPTION OF THE PREFERRED EMBODIMENT

An embodiment of a two stage-ignition air bag apparatus for a vehicle and igniting method thereof of the present invention will be described below in detail by taking a passenger seat as an example and by proper reference to FIGS. 1 to 3.

Figure 1:
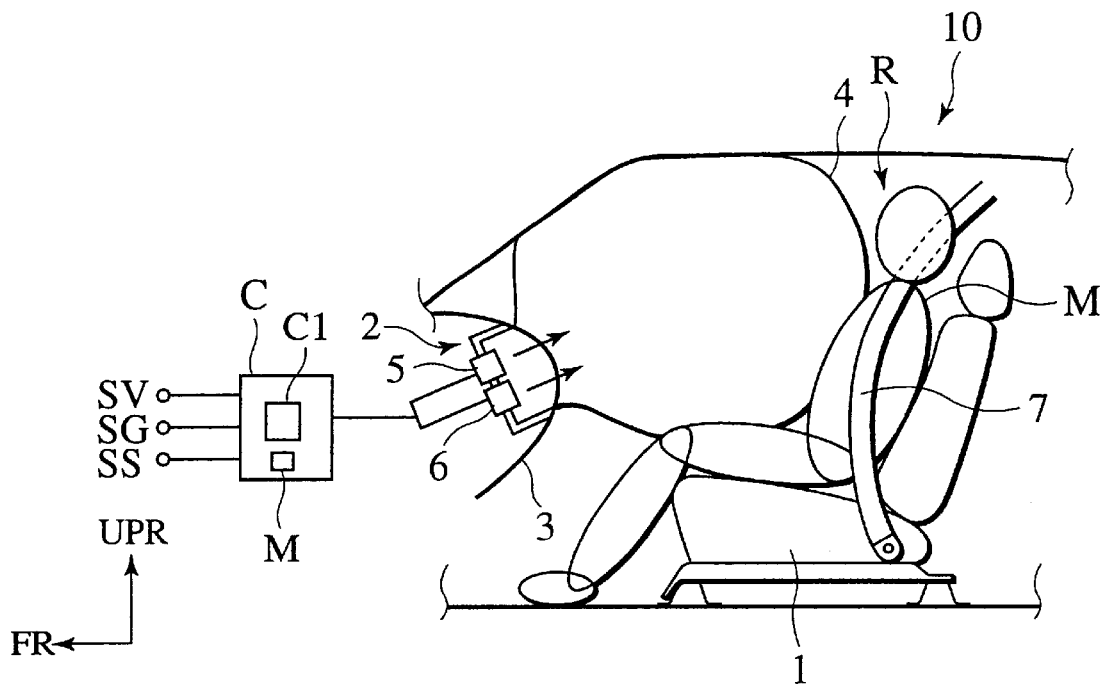
FIG. 1 is a side view showing an inflated state of an air bag of an embodiment of a two stage-ignition air bag apparatus for a vehicle of the present invention when a seatbelt is worn.
Figure 2:
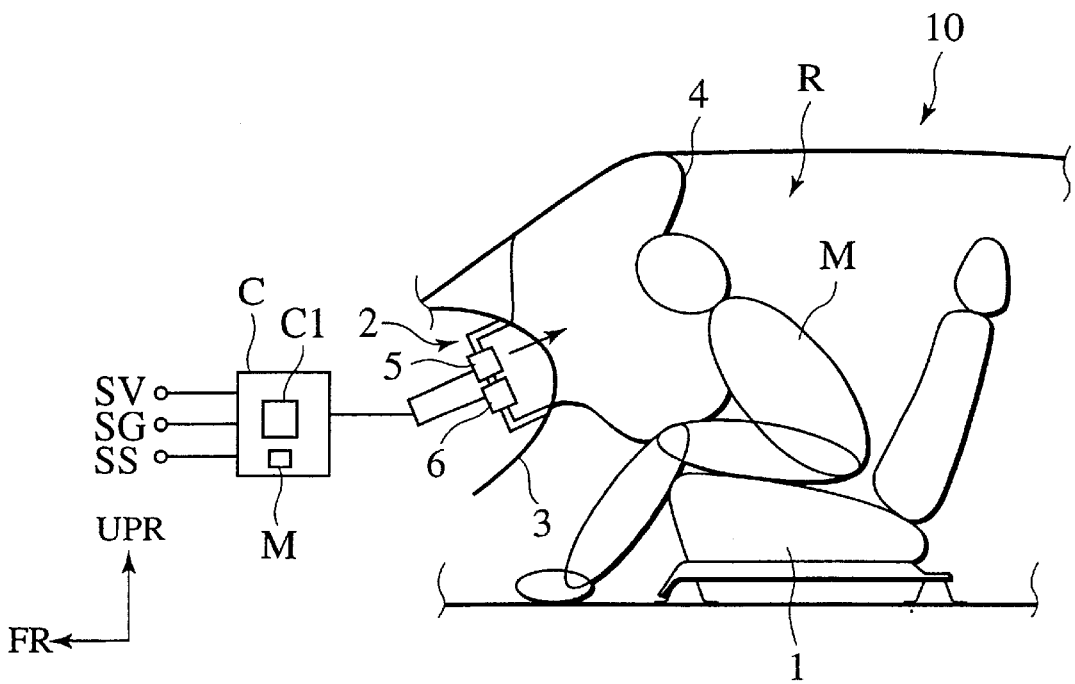
FIG. 2 is a side view showing an inflated state of the air bag of the embodiment when the seatbelt is not worn.

In FIGS. 1 and 2, an air bag apparatus 2 is disposed in front of a passenger M sitting on a passenger seat 1 of a vehicle 10. An arrow FR in the drawings shows a forward direction of the vehicle 10 and an arrow UPR shows an upward direction of the vehicle 10.

The air bag apparatus 2 is disposed in an instrument panel 3 and includes an air bag 4, a first inflator 5, and a second inflator 6.

In the first inflator 5 and second inflator 6, gas generating agent that burns to generate high-pressure gas when ignited is housed respectively in sealed states.

The air bag 4 is inflated toward an inner side of a vehicle room R by the high-pressure gas generated from the first inflator 5 and second inflator 6 to receive and protect the passenger M.

The air bag apparatus 2 further includes a controller C. The first inflator 5 and second inflator 6 are controlled by the controller C such that the first inflator 5 is first ignited and then, the second inflator 6 is ignited thereafter.

The controller C has a structure for properly controlling the ignition timings of the first inflator 5 and second inflator 6. Specifically, the controller C is connected to a vehicle velocity sensor SV for detecting a velocity of the vehicle 10, an acceleration sensor SG for detecting acceleration to detect collision of the vehicle 10, and a seatbelt sensor SS for detecting a fastened state and an unfastened state of the seatbelt 7 and includes a velocity difference calculating circuit C1, a necessary memory M, and the like.

Next, by reference to FIG. 3, the ignition timings of the first inflator 5 and second inflator 6 controlled by the controller C will be described.

Figure 3:
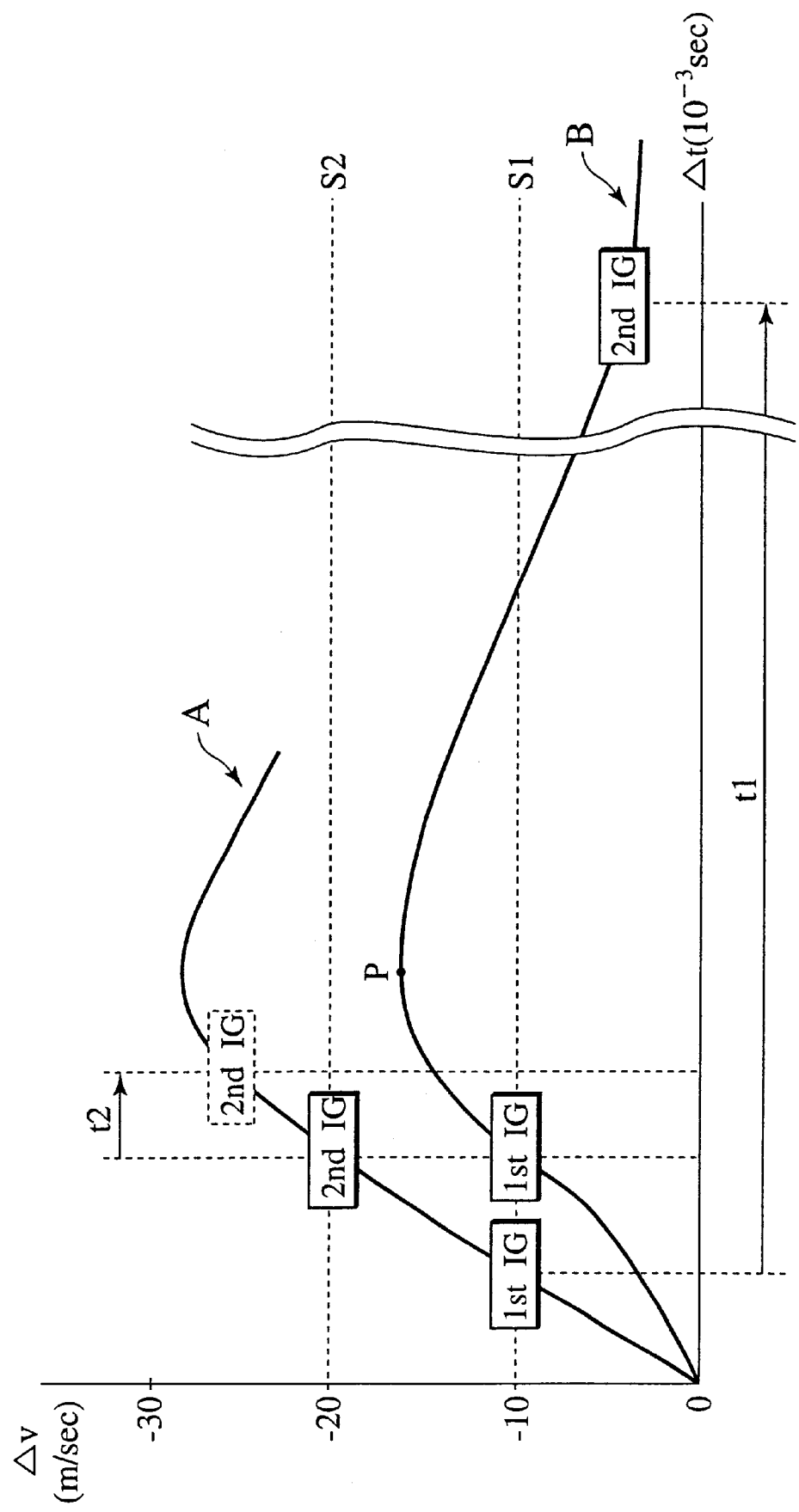
FIG. 3 is a graph showing ignition timings of a first inflator and a second inflator of the embodiment.

FIG. 3 is a graph in which a horizontal axis indicates time $\Delta t$ that has passed since collision and a vertical axis indicates a velocity difference $\Delta V$ between velocities at present and at time of the collision.

The controller C detects a vehicle velocity by the vehicle velocity sensor SV and detects a collision generated time by the acceleration sensor SG.

The controller C calculates the velocity difference ΔV between the vehicle velocity detected by the vehicle velocity sensor SV at the collision generated time of the vehicle detected by the acceleration sensor SG and the vehicle velocity detected similarly after the collision (after the time when the collision is detected) by the velocity difference calculating circuit C1. The velocity difference ΔV calculated by the velocity difference calculating circuit C1 is used as "a value of a velocity difference according to collision severity" as described later.

In a memory M of the controller C, a first threshold value S1 corresponding to first collision severity and a second threshold value S2 corresponding to collision severity greater than the first collision severity are set in advance.

The first threshold value S1 is a value for allowing the controller C to judge the case to be "a case of a small extent of collision" and the second threshold value S2 is a value for allowing the controller C to judge the case to be "a case of a great extent of collision".

Specifically, when the velocity difference ΔV does not reach the first threshold value S1, the air bag apparatus 2 is not actuated at all.

In other words, the above structure is not for comparing simply a degree of change per unit time in a velocity (negative acceleration) of a vehicle detected on the time series by the acceleration sensor and the like and using its correspondingly predetermined threshold value but for comparing the velocity difference ΔV between a vehicle velocity when the collision is detected and a vehicle velocity after the collision and using its first threshold value S1.

By substantially using the velocity difference ΔV as, so to speak, "the value of the velocity difference according to the collision severity", it is possible to effectively prevent unnecessary ignition of the inflator in a case in which large negative acceleration that exceeds the threshold vale is generated in an extremely short time for any reason (when impulse is small), which is a case occurring when the degree of change per unit time in the velocity (negative acceleration) of the vehicle is simply used and the threshold value corresponding to the degree is set.

Then, the first inflator 5 is ignited when the velocity difference ΔV has reached the first threshold value S1.

The second inflator 6 is ignited when the velocity difference ΔV has reached the second threshold S2 or when a predetermined time t1 (a few seconds or so, for example) has passed since the velocity difference ΔV reached the first threshold S1 when the velocity difference ΔV has not reached the second threshold S2.

In this aspect also, the velocity difference ΔV is substantially used as, so to speak, "the value of the velocity difference according to the collision severity".

Control of the ignition timings of the first inflator 5 and the second inflator 6 in the case of the great extent of collision shown by a curve A in FIG. 3 and the case of the small extent of collision shown by a curve B will be separately described in further detail.

In the case of the great extent of collision, a rise of the curve A of the velocity difference ΔV is large, and therefore, the velocity difference ΔV reaches the first threshold value S1 and the second threshold value S2 instantaneously.

The first inflator 5 is ignited when the velocity difference ΔV has reached the first threshold value S1 (when ΔV=−10 m/sec on the curve A) and the second inflator 6 is ignited when the velocity difference ΔV has reached the second threshold value S2 (when ΔV=−20 m/sec on the curve A).

Here, the timing of ignition of the second inflator 6 at the second threshold value S2 is further separated into two timings in a case in which the passenger M is wearing the seatbelt 7 as shown in FIG. 1 and in a case in which the passenger M is not wearing the seatbelt 7 as shown in FIG. 2. It is the seatbelt sensor SS that detects the fastened state and unfastened state of the seatbelt 7.

If it is detected that the passenger M is wearing the seatbelt 7, the second inflator 6 is ignited immediately after the velocity difference has reached the second threshold value S2 (when ΔV=−20 m/sec on the curve A). This is because it is preferable that inflation of the air bag 4 is completed in receiving the passenger M in the air bag 4 because forward movement of the passenger M in collision is small and the passenger M is protected by the seatbelt 7 to some extent when the passenger M is wearing the seatbelt 7.

On the other hand, when it is detected that the passenger M is not wearing the seatbelt 7, the second inflator 6 is ignited after a slight time t2 ($3 \times 10^{-2}$ sec or so, for example) has passed since the velocity difference ΔV reached the second threshold value S2 (when ΔV=−20 m/sec on the curve A). This is because it is preferable that the air bag 4 continues to inflate for a longer time than in a case in which the passenger is wearing the seatbelt because forward movement of the passenger M in collision is large and the passenger M is not protected by the seatbelt 7 when the passenger M is not wearing the seatbelt 7 and thus, because a time period during which the passenger M is received by the air bag 4 is longer.

If the ignition of the second inflator 6 is delayed by the slight time t2, the delay time itself is as short as $3 \times 10^{-2}$ sec, for example, in view of a series of inflating behavior of the air bag 4. Therefore, in such a series of inflating behavior, the basic timing of "when the velocity difference has reached the second threshold value S2" is substantially similar in a technical sense of receiving the passenger M.

By setting the above ignition timings, it is possible to deploy the air bag 4 further appropriately toward the passenger M substantially regardless of whether the passenger M is wearing the seatbelt 7 or not.

On the other hand, in the case of the small extent of collision, a rise of the curve B of the velocity difference ΔV is small and continues for a short time period, and therefore, the velocity difference ΔV reaches the first threshold value S1 relatively soon but does not reach the second threshold value S2. The curve B passes through a point P where a slope of the curve B becomes 0 and slopes down gradually. However, in such a case in which the curve B does not reach the second threshold value S2, the second inflator 6 is ignited when a predetermined time t1 (few seconds, for example) has passed since the velocity difference reached the first threshold value S1.

As described above, in the present embodiment, because both the first inflator 5 and second inflator 6 are ignited whether the extent of collision is large or small, it is possible to effectively prevent the unused gas generating agent from remaining in the air bag apparatus 2 after use.

Therefore, the used air bag apparatus 2 can be disposed of easily, not necessarily by the disposal specialty service.

When the passenger is wearing the seatbelt, the second inflator 6 is ignited immediately after the velocity difference reached the predetermined threshold value to complete inflation of the air bag early. On the other hand, when the passenger is not wearing the seatbelt, the second inflator 6 is ignited after a short time has passed since the velocity difference reached the predetermined threshold value to slightly delay inflation of the air bag.

As a result, it is possible to properly deploy the air bag regardless of whether the passenger is wearing the seatbelt or not.

The velocity difference between the vehicle velocity at the time when the collision is detected and the vehicle velocity after the collision is used as the value according to the collision severity.

Therefore, it is possible to effectively prevent unnecessary ignition of the inflator in a case in which large negative acceleration is generated in an extremely short time (when impulse is small).

Although the air bag apparatus 2 provided in the instrument panel 3 is taken as an example in the present embodiment, the structure can be of course applied to air bag apparatuss disposed on other portions.

The entire contents of a Patent Application No. TOKUGANHEI 11-140327 with a filing date of May 20, 1999 in Japan, are hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A two stage-ignition air bag apparatus for a vehicle, comprising:
   an air bag;
   a first inflator configured to ignite when a value according to collision severity has reached a first threshold value in order to inflate the air bag; and
   a second inflator configured to ignite at an earlier one of a first time when the value according to collision severity has substantially reached a second threshold value that is greater than the first threshold value and a second time when a predetermined time has passed since the value according to collision severity reached the first threshold value in order to inflate the air bag.

2. A two stage-ignition air bag apparatus for a vehicle according to claim 1, wherein the second inflator is ignited when the value according to collision severity has reached the second threshold value when a seatbelt is worn.

3. A two stage-ignition air bag apparatus for a vehicle according to claim 1, wherein the second inflator is ignited when a predetermined delay time has passed since the value according to collision severity reached the second threshold value when a seatbelt is not worn.

4. A two stage-ignition air bag apparatus for a vehicle according to claim 1, wherein the second inflator is configured to ignite after the predetermined time has passed since the value according to collision severity reached the first threshold value even if the second threshold value is not reached.

5. A two stage-ignition air bag apparatus for a vehicle according to claim 1, wherein the first inflator is not ignited when the value according to collision severity does not reach the first threshold value.

6. A two stage-ignition air bag apparatus for a vehicle according to claim 1, wherein the value according to collision severity is set by utilizing a velocity difference between a vehicle velocity at a time when collision is detected and a vehicle velocity after detection of the collision.

7. A two stage-ignition air bag apparatus for a vehicle according to claim 6, further comprising a vehicle velocity sensor, a collision sensor, and a velocity difference calculating circuit,
   wherein the velocity difference calculating circuit calculates a velocity difference between a vehicle velocity detected by the vehicle velocity sensor at a time when the collision is detected by the collision sensor and a vehicle velocity detected by the vehicle velocity sensor after the time when the collision is detected.

8. A two stage-ignition air bag apparatus for a vehicle according to claim 1, wherein the two stage-ignition air bag apparatus for a vehicle can be used as that for a passenger seat.

9. A two stage-ignition air bag apparatus for a vehicle, comprising:
   an air bag;
   first gas generating means configured to ignite when a value according to collision severity has reached a first threshold value in order to inflate the air bag; and
   second gas generating means configured to ignite at an earlier one of a first time when the value according to collision severity has substantially reached a second threshold value that is greater than the first threshold value and a second time when a predetermined time has passed since the value according to collision severity reached the first threshold value in order to inflate the air bag.

10. A method of igniting a two stage-ignition air bag apparatus for a vehicle including a first inflator and a second inflator comprising:
    igniting the first inflator when a value according to collision severity has reached a first threshold value; and
    igniting the second inflator at an earlier one of a first time when the value according to collision severity has substantially reached a second threshold value that is greater than the first threshold value and a second time when a predetermined time has passed since the value according to collision severity reached the first threshold value.

* * * * *